United States Patent
Pike et al.

(10) Patent No.: US 7,860,009 B2
(45) Date of Patent: Dec. 28, 2010

(54) PROVIDING BACKPRESSURE FLOW CONTROL TO SPECIFIC TRAFFIC FLOWS

(75) Inventors: Dion Pike, Stittsville (CA); Mark Megarity, Ottawa (CA)

(73) Assignee: Alcatel Lucent, Paris (FR)

( * ) Notice: Subject to any disclaimer, the term of this patent is extended or adjusted under 35 U.S.C. 154(b) by 211 days.

(21) Appl. No.: 12/147,137

(22) Filed: Jun. 26, 2008

(65) Prior Publication Data

US 2009/0323526 A1 Dec. 31, 2009

(51) Int. Cl.
*H04L 12/24* (2006.01)
(52) U.S. Cl. .................. 370/235; 370/412
(58) Field of Classification Search ............ None
See application file for complete search history.

(56) References Cited

U.S. PATENT DOCUMENTS

| | | | |
|---|---|---|---|
| 5,838,922 A * | 11/1998 | Galand et al. ............ 709/232 |
| 5,862,128 A | 1/1999 | Cooperman et al. |
| 6,108,307 A | 8/2000 | McConnell |
| 6,981,054 B1 | 12/2005 | Krishna |
| 7,058,070 B2 * | 6/2006 | Tran et al. ............ 370/412 |
| 2009/0080329 A1 * | 3/2009 | Pike et al. ............ 370/230 |
| 2009/0103434 A1 * | 4/2009 | Madsen et al. ........... 370/232 |

FOREIGN PATENT DOCUMENTS

EP 1798914 A 6/2007

OTHER PUBLICATIONS

Ge et al, DiffServ Compatible Extended Pause (DiffPause) for Fair Congestion Control in Metro-Ethernet, IEEE, 5 pages, 2004.*

* cited by examiner

*Primary Examiner*—Frank Duong
(74) *Attorney, Agent, or Firm*—Kramer & Amado P.C.

(57) ABSTRACT

A method and apparatus for providing backpressure flow control to traffic flows of a data communications system are provided. Embodiments of the invention selectively apply a measure of flow control to traffic flows responsive to a level of congestion at a packet processor of the system. These embodiments advantageously provide flexibility in the application of flow control to specific traffic flows in accordance with one or more of characteristics of those traffic flows.

20 Claims, 4 Drawing Sheets

Flow Control Table

| Priority Based Backpressure Message | Ingress Traffic | Recirculation Traffic | Egress Traffic |
|---|---|---|---|
| Type 1 | None | None | None |
| Type 2 | BE | None | BE Service |
| Type 3 | BE & EF | DPI | BE Service |

VOQ Assignment Table

| VOQ | Traffic Type |
|---|---|
| 1 | Recirculation Traffic (DPI) |
| 2 | Egress (Mirrored) |
| 3 | Egress (Premium Service) |
| 4 | Egress (Best Effort Service) |

VOQ Flow Control Message

| | VOQ$_1$ | VOQ$_2$ | VOQ$_3$ | VOQ$_4$ |
|---|---|---|---|---|
| | 0 | 0 | 0 | 0 |
| | 0 | 0 | 0 | 1 |
| | 1 | 0 | 0 | 1 |

Priority Based Backpressure Message

| | | |
|---|---|---|
| Type 1 | 0 | 1 |
| Type 2 | 1 | 0 |
| Type 3 | 1 | 1 |

Figure 4

PROVIDING BACKPRESSURE FLOW CONTROL TO SPECIFIC TRAFFIC FLOWS

FIELD OF THE INVENTION

The invention is directed to communication networks and in particular to flow control in data communications systems.

BACKGROUND OF THE INVENTION

Backpressure signaling is commonly employed in flow control techniques used in data communications systems. These techniques can be used on communication links between data communications systems, and also for communications between subsystems of data communications systems. Generally, the purpose of such backpressure flow control techniques is to prevent data packet loss at receiver queues caused by overflowing those queues.

Legacy backpressure flow control techniques typically employ simple on-off signaling. According to this technique, crossing a fill-level threshold at a receiver queue causes a backpressure signal (e.g. halt) to be generated, which is then sent to the source of the data packets. In the case of inter-system communication, the data packet source would typically be a transmit buffer of another data communications system. In the case of intra-system communication, the data packet source would typically be an egress queue of a subsystem and the receiver queue would be an ingress queue of another subsystem. One type of backpressure signal (e.g. halt) indicates to the source that it should suspend sending data packets to that queue until further notice, which will be given in the form of another type of backpressure signal (e.g. resume). In some cases there can be more than one data packet source, and in those cases the backpressure signals would normally be sent to all of those sources. This technique has been highly successful in data communications systems because it is simple to implement; requiring only a limited amount of information to be sent back to the transmitting source to process.

More advanced backpressure flow control techniques are known that offer more than simple on-off signaling. These include techniques that progressively throttle the flow rate of data packets to a queue as successively higher fill-level thresholds are exceeded at the queue. Other techniques have means for applying backpressure flow control to data packets of only certain priorities. However, using priority alone may not be enough in some cases, especially when it is desirable to selectively provide individual flow control to one or more types of traffic flows irrespective of the priority of data packets in those flows.

One of the challenges in designing state of the art traffic management for a data communications system is that internal congestion of the system is often due to performance limits of packet processing and traffic management engines of the system as well as limitations on their bus interfaces. These limitations typically result in a backpressure flow control solution that has limited capability to react flexibly to such congestion.

Accordingly, there is a need to a provide backpressure flow control that can be flexibly applied to various types of traffic flows carried by a data communications system.

SUMMARY OF THE INVENTION

In a data communications system, embodiments of the invention selectively provide backpressure flow control to traffic flows by applying a measure of flow control to the traffic flows responsive to a level of congestion at a packet processor of the system.

According to an aspect of the present invention an apparatus for providing backpressure flow control to traffic flows of a data communications system is provided. The apparatus includes a packet processing module for performing packet processing operations on data packets of the traffic flows; a backpressure module for determining a level of congestion of the packet processing module; a flow mapping engine for determining, in dependence upon the level of congestion, which of the traffic flows require a measure of flow control; and a traffic management module for receiving processed data packets from the packet processing module and for applying the measure of flow control to one or more of the traffic flows as required.

According to another aspect of the present invention a method of performing flow control of traffic flows in a data communications system is provided. The method comprises the steps of detecting a level of congestion of a packet processing module in the data communications system; determining whether or not a measure of flow control should be applied to a traffic flow being processed by the packet processing module depending on the level of congestion; and applying the measure of flow control to the traffic flow responsive to the determination being affirmative.

Advantageously, embodiments of the invention can be implemented without significantly adding to the cost of a data communications system, which can be especially beneficial since traffic management can be a major differentiator between data communications systems.

BRIEF DESCRIPTION OF THE DRAWINGS

The invention will be further understood from the following detailed description with reference to the drawings, in which:

FIG. 2 depicts an example of the flow control table of FIG. 1;

FIG. 3 depicts an example of the virtual output queue (VOQ) assignment table of FIG. 1;

FIG. 4 depicts example backpressure messages and corresponding VOQ flow control messages of FIG. 1.

DETAILED DESCRIPTION

Figure 1:
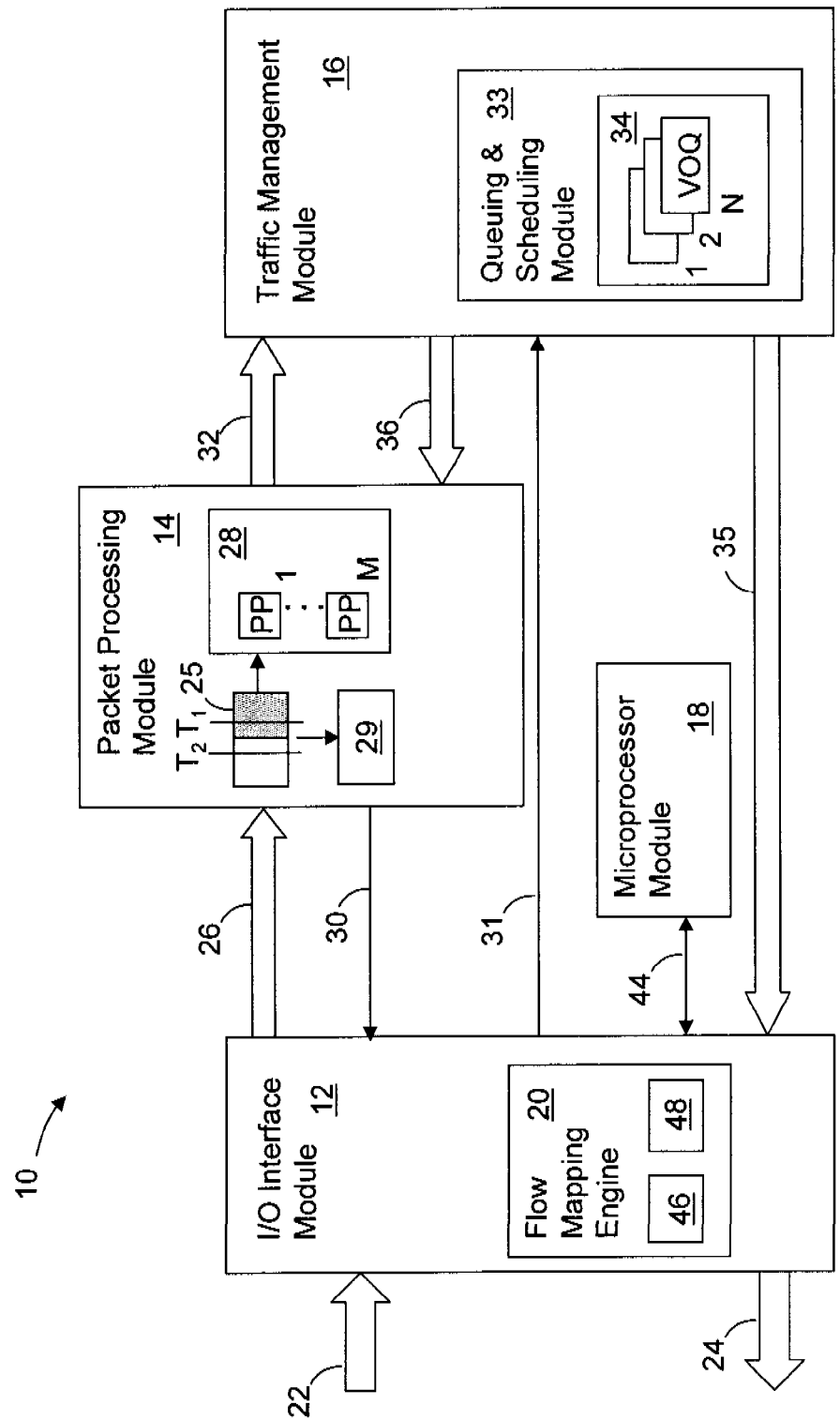
FIG. 1 is a high level block diagram of an apparatus for providing backpressure flow control to specific traffic flows in accordance with an embodiment of the present invention.

Referring to FIG. 1, an apparatus 10 for providing backpressure flow control in a data communication system includes an input/output (I/O) interface module 12 that is in communication with a packet processing module 14, a traffic management module 16 and a microprocessor module 18. The packet processing module 14 and the traffic management module 16 are also in communication with each other.

The I/O interface module 12 includes a plurality of input ports for receiving ingress data packets 22 from a source within the data communication system, such as customer facing ports, and forwarding them to the packet processing module 14 as ingress traffic 26. The I/O interface module 12 also includes a plurality of output ports for transmitting egress data packets 24 to a destination within the communication system such as I/O ports of the data communication system.

The I/O interface module 12 further includes a flow mapping engine 20 for mapping backpressure messages received from the packet processing module 14 to priorities of the ingress data packets 22 so that the I/O interface module 12 can provide backpressure flow control on the ingress traffic 26. A flow control table 46 is included in the flow mapping engine 20 for performing such mapping, as will be described later in more detail.

The packet processing module 14 includes an input buffer 25 for storing the ingress data packets 22 received from the I/O interface module 12 as ingress traffic 26. A plurality of successive fill level thresholds, shown as first and second thresholds T1 and T2 respectively, is defined with respect to the input buffer 25. A fill level of the input buffer 25, shown shaded in grey, is between the first and second thresholds. The packet processing module 14 also includes a plurality of M packet processors (PP), which are operated in parallel to provide high throughput packet processing operations on data packets received from the input buffer 25. The packet processing module 14 further includes a backpressure module 29 that formulates a backpressure message 30 by comparing a current fill level of the input buffer 25 to the plurality of fill level thresholds. The backpressure message 30 is communicated to the I/O interface module 12 where it is used to determine which, if any, priorities of ingress data packets 22 should have a measure of flow control applied to them.

With reference to Internet Protocol Differentiated Services traffic classifications an example of the foregoing backpressure flow control is provided. Using two fill level thresholds, three different values of backpressure messages 30, also referred to herein as types, can be defined. A first type of such messages corresponds to a current fill level of the input buffer 25 being less than the first threshold T1. Similarly, a second type of such messages corresponds to the current fill level being less than the second threshold T2 but greater than or equal to the first threshold T1. Finally, a third type of such messages corresponds to the current fill level being greater than or equal to the second threshold T2. Upon receiving a backpressure message 30 of the first type the I/O interface module 12 continues to pass data packets of every priority to the packet processing module 14 as ingress traffic 26. However, responsive to receiving a backpressure message 30 of the second type the I/O interface module 12 will halt best effort (BE) traffic flows by not including such data packets in the ingress traffic 26. Further, responsive to receiving a backpressure message 30 of the third type the I/O interface module 12 will halt best effort traffic flows and expedited forwarding (EF) traffic flows by not including such data packets in the ingress traffic 26. In this case only data packets of the assured forwarding (AF) type would be included in the ingress traffic 26 which is sent to the packet processing module. The reception of a new backpressure message 30 supersedes a previous one of such messages, so that traffic flows are halted or resumed in accordance with the content of a backpressure message 30 most recently received by the I/O interface module 12. In this example halting traffic flows constitutes applying a measure of flow control to such flows.

The packet processing module 14 reads data packets from the input buffer 25 and performs packet processing on them via the plurality of packet processors 28, resulting in processed data packets 32 which are communicated to the traffic management module 16. The type of processing performed on the data packets includes basic protocol termination operations and may include advanced operations such as deep packet inspection (DPI). The traffic management module 16 includes a queuing and scheduling module 33 for performing traffic management operations on the processed data packets 32, which results in managed traffic flows of data packets. The queuing and scheduling module 33 includes a plurality of virtual output queues (VOQs) 34 for storing data packets of the managed traffic flows before they are either communicated to I/O interface module 12 as egress traffic 35 or to the packet processing module 14 as recirculation traffic 36 that requires further processing.

Normally each one of the plurality of VOQs is associated with a respective traffic flow, however it is possible in some cases that a VOQ is not assigned to any traffic flow if capacity of the data communication system exceeds requirements. Each traffic flow is distinguished from other traffic flows by source and destination addresses and protocol port identifiers of data packets in the traffic flow. Additionally, any of the traffic flows may be distinguished by other factors such as owner or customer of the traffic flow, and a service supported by the traffic flow.

Returning to the functionality of the flow mapping engine 20, the engine 20 is further operable to perform mapping of backpressure messages 30 to the VOQs 34 in order to formulate a VOQ flow control message 31. A VOQ assignment table 48 is included in the flow mapping engine 20 for this purpose, as will be described later in more detail. The VOQ flow control message 31 is sent to the traffic management module 16 and is used in providing flow control to the recirculation traffic 36 being sent to the packet processing module 14, and optionally to the egress traffic 35. Although the egress traffic 35 does not directly affect the current fill level of the input buffer 25, depending on the services and applications involved, flow controlling the egress traffic 35 in some cases may have a desirable effect of reducing the current fill level of the input buffer 25.

With reference to the foregoing example concerning three types of priority based backpressure messages 30, an example of mapping such messages to the VOQs 34 to formulate a VOQ flow control message 31 will now be presented. For example suppose that there a four VOQs 34, a first of which is for recirculation traffic 36 (e.g. involving DPI operations), a second of which is for egress traffic 35 that is being mirrored (e.g. for lawful interception by a government agency), a third of which is for a customer paying for a premium service, and a fourth of which is for a customer paying for a best effort service. In the case that the mapping engine 20 receives the first type of backpressure message 30 (i.e. the current fill level is less than the first threshold T1) none of the VOQs 34 would have a measure of flow control applied to them. Hence a VOQ flow control message 31 would be generated to that effect. In this example only one measure of flow control is used, which is to halt emission of all data packets of a given traffic flow from a VOQ; however, other measures of flow control such as rate limiting could be used instead. In the case that the mapping engine 20 receives the second type of backpressure message 30 (i.e. the current fill level is less than the second threshold and less than or equal to the first threshold), traffic of the best effort service customer would have a measure of flow control applied to it. Hence a VOQ flow control message 31 would be generated that indicates that traffic flow from the fourth VOQ is to be halted. In the case that the mapping engine 20 receives the third type of backpressure message 30 (i.e. the current fill level is greater than or equal to the second threshold), the recirculation traffic 36 and the traffic of the best effort service customer would have a measure of flow control applied to them. Hence a VOQ flow control message 31 would be generated that indicates that traffic flows from the first and fourth VOQs are to be halted. Note that in this example, due to the level of service required by the traffic of the second and third VOQs, traffic from those VOQs is not halted for any type of backpressure message 30.

Referring to FIG. 2, an example of the flow control table 46 will now be described. The example corresponds to the foregoing examples regarding backpressure messages 30 and VOQ flow control messages 31. The left hand column of the flow control table 46 includes the three types of backpressure messages 30 in the foregoing examples, each type being in a respective row. The remaining columns indicate which data packet priorities of ingress traffic 26 are to be flow controlled and which types of traffic flows of recirculation traffic 36 and egress traffic 35 are to be flow controlled; there being a respective column for each of ingress, recirculation and egress traffic. The flow mapping engine 20 maps backpressure messages 30 to priorities of ingress traffic 26 and to types of recirculation 36 and egress traffic 35 flows by indexing to a row in the flow control table 46 according to the type of backpressure message 30 that it has presently received from the packet processing module 14, and reading from that row the data packet priorities and types of traffic flows that are to have a measure of flow control applied to them. In this example the measure of flow control applied is to halt the flow of data packets of the traffic flow in question. For example, for a third type of backpressure message 30, shown as type 3 in FIG. 2, the flow mapping engine 20 would read the third row in the flow mapping table 46, which indicates that best effort and expedited forwarding priorities of ingress traffic 26 are to be halted, the DPI type of recirculation traffic 36 is to be halted, and the best effort service type of egress traffic 35 is to be halted. In this manner, backpressure flow control is selectively provided to specific traffic flows by applying a measure of flow control to the traffic flows responsive to a backpressure message, which indicates a level of congestion in the packet processing module. The reception of a new backpressure message 30 supersedes a previously received one of such messages, so that various measures of flow control are applied to traffic flows in accordance with the content of a backpressure message 30 most recently received by the I/O interface module 12.

Referring to FIG. 3, an example of the VOQ assignment table 48 will now be described. The example corresponds to the foregoing examples regarding backpressure messages 30 and VOQ flow control messages 31. The left hand column of the VOQ assignment table 48 includes identifiers of the VOQs, wherein each VOQ has a numeric identifier in a respective row. The other column includes an indication of the type of traffic flows being managed by the VOQs; wherein each row includes a respective traffic flow indication for the traffic flow to be managed by the VOQ identified in that row. The flow mapping engine 20 maps the backpressure messages 30 to the VOQs by first determining the types of traffic flows of the recirculation traffic 36 and egress traffic 35 to have a measure of flow control applied to them. This is done using the flow control table 46 as previously explained with reference to FIG. 2. Then by reading through the VOQ assignment table 48 and comparing the indication of traffic flows to those to have a measure of flow control applied to them as previously determined, the flow mapping engine 20 records the corresponding VOQ identifier for all such comparisons that result in a match.

Referring to FIG. 4, an example of backpressure messages 30 and corresponding VOQ flow control messages 31 will now be described. The example corresponds to the foregoing examples regarding backpressure messages 30 and VOQ flow control messages 31. The three different types of backpressure messages 30 used in the foregoing examples are shown at the left hand side of the figure, wherein the actual format of each is a binary number representing the ordinal of the message type. For each type of priority based backpressure message 30 shown at the left hand side of the figure there is a corresponding VOQ flow control message 31 adjacent to it at the right hand side of the figure. The format of each VOQ flow control message 31 includes a one bit field for each VOQ 34; the position of each such field in the message 31 corresponds to the numeric identifier of the VOQ in the VOQ assignment table 48. The content of a VOQ flow control message 31 comprises a binary indicator in each field, each such indicator providing an indication whether or not a traffic flow being managed by the VOQ corresponding to that field is to have a measure of flow control applied to it. In this example the measure of flow control applied is to halt all data packets of the given traffic flow from the VOQ in question. However, the measure could also be other measures such as rate limiting the traffic flow. In FIG. 4, a value of '1' indicates that the traffic flow is to be halted whereas a value of '0' indicates that the traffic flow is not to be halted.

The microprocessor module 18 inserts control plane traffic 44 into the control plane via the I/O interface module 12. Likewise control plane traffic 44 is extracted from the control plane by the I/O interface module 12 and communicated to the microprocessor module 18. Instructions from the control plane for populating the flow control table 46 and the VOQ assignment table 48 are communicated to the flow mapping engine 20 via the microprocessor module 18. These instructions initiate as a result of traffic and service provisioning operations that are performed on the data communications system through an operator console, network management system, or other type of operations support system. The mapping functionality of flow mapping engine 20 is also applied to control plane traffic in order to flow control specific types of control plane traffic 44.

Figure 5:
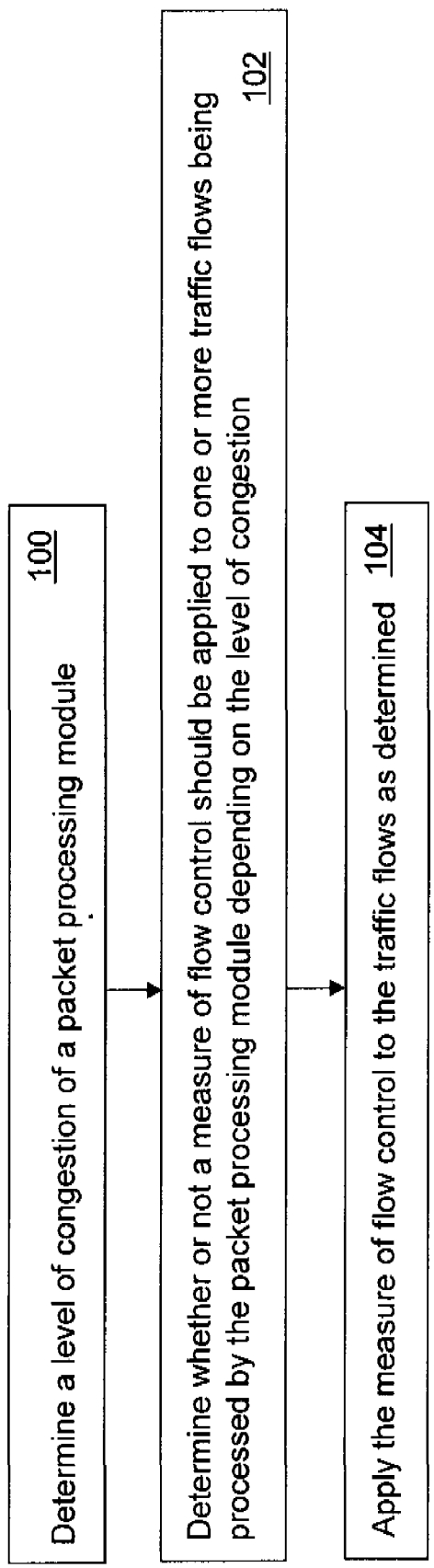
FIG. 5 is a flow chart of a method of performing backpressure flow control on traffic flows in accordance with a second embodiment of the present invention.

Referring to FIG. 5, a method of performing flow control of traffic flows of data packets in accordance with a second embodiment of the present invention will now be described. The method starts at a step 100 of determining a level of congestion of a packet processing module in the data communications system. In some cases, determining the level of congestion comprises a step of comparing a current fill level of an input buffer of the packet processing module to one or more fill level thresholds, and forming a backpressure message as a result of such comparison. In such cases, the backpressure message has a value that corresponds to a relationship between the current fill level and the one or more fill level thresholds. Following that step 100 the method proceeds to a step 102 of determining whether or not a measure of flow control should be applied to one or more traffic flows being processed by the packet processing module depending on the determined level of congestion. In some cases, determining whether or not a measure of flow control should be applied comprises determining such for one or more of: ingress traffic flows to the packet processing module, recirculation traffic flows to the packet processing module, and egress traffic flows from the data communication system. Furthermore, where a backpressure message has been formed in the step 100 of determining a level of congestion, the present step 102 includes determining in accordance with the value of the backpressure message which, if any, priorities of data packets of ingress traffic flows to the packet processing module are to have a measure of flow control applied to them and which, if any, types of recirculation and egress traffic flows are to have a measure of flow control applied to them. Following that step 102 the method proceeds to a step 104 of applying the measure of flow control to the traffic flows as determined. In some cases, this step 104 of applying a measure of flow control comprises halting the flow of data packets of ingress traffic to the packet processing module for data packets having a priority determined to require a measure of flow control, and halting the flow of data packets of egress and recirculation traffic flows of traffic types determined to require a measure of flow control. In some cases, where traffic management of egress and recirculation traffic flows involve VOQs, halting such traffic flows comprises changing a status of each VOQ corresponding to a respective one of such traffic flows such that the VOQ halts the flow of data packets from it. The method ends at the step 104 of applying a measure of flow control. However, under normal operation the method would continually repeat itself, and in each such iteration, a measure of flow control is applied to traffic flows as required by determinations of the method and released from application resulting from the previous iteration. That is, each iteration of the method operates independently from the previous iteration, such that where some traffic flows may have a measure of flow control (e.g. halting) applied as a result of one iteration, the same traffic flows may have no measure of flow control applied to them (e.g. resumed) in the next iteration.

In view of the foregoing it should now be apparent that different types of backpressure messages 30 are generated as the input buffer 25 of packet processing module 14 begins to congest, specifically as the fill level of the input buffer 25 crosses one or more fill level thresholds. The flow mapping engine 20 maps this backpressure message 30 that it receives from the packet processing module 14 to priorities of ingress data packets 22 and to VOQs 34. From the latter, the flow mapping engine 20 generates a VOQ flow control message 31 and sends it to the traffic management module 16 to flow control traffic flows from one or more of the VOQs 34. For example, one type of backpressure message could map to VOQs associated with Ethernet or multicast traffic, or to VOQs associated with a services I/O blade such as an Internet Protocol Security (IPSEC) circuit card of the data communications system. Such capabilities provide advantageous enhancements to traffic management such as enabling network traffic to be more intelligently processed and distributed during congestion conditions, which can be a key differentiator in data communications systems such as service routers.

Numerous modifications, variations and adaptations may be made to the embodiment of the invention described above without departing from the scope of the invention, which is defined in the claims. For example, the input buffer 25 of the packet processing module 14 could be replaced by multiple input buffers with several fill level thresholds assigned to each. For example, there could be one such input buffer for each packet processor PP. In that case, the backpressure module 29 would formulate a backpressure message 30 according to the fill levels and corresponding thresholds of all such input buffers. Additionally, a link buffer could be included in one or more of the modules receiving the ingress traffic 26, the processed data packets 32, the recirculation traffic 36, and the egress traffic 35, with a respective on/off flow control signal to provide simple backpressure for each such link buffer. This modification would be to enable bursting of data packets to such modules at a rate higher than the modules can process the packets for overall greater packet throughput of the apparatus. A variation would be to include the VOQ assignment table 48 in the traffic management module 16. Another variation would be to combine the flow control table 46 and the VOQ assignment table 48 into one table so that the VOQs of traffic flows requiring a measure of flow control applied to them can be read from the combined table by indexing to a row in the table according to the type of backpressure message. For example, the type of traffic flow information in the flow control table 46 could be replaced by the numerical identifiers of VOQs carrying those types of traffic flows, as specified in the VOQ assignment table. In this case, the combined table could reside in the flow mapping engine 20.

Although the foregoing examples involved only a few VOQs 34, typically there would be hundreds of such VOQs in a high capacity data communications system. Furthermore, there could also be many fill level thresholds associated with an input buffer of a packet processing module in order to provide a fine granularity of congestion level detection.

It should now be apparent from the foregoing description of embodiments of the invention that these embodiments advantageously provide flexibility in the application of a measure of flow control to specific traffic flows in accordance with one or more of characteristics of the specific traffic flows.

What is claimed is:

1. An apparatus for providing backpressure flow control to traffic flows of a data communications system, comprising:
   a packet processing module for performing packet processing operations on data packets of the traffic flows;
   a backpressure module for determining a level of congestion of the packet processing module based upon at least two different thresholds;
   a flow mapping engine for determining, in dependence upon the level of congestion, which of the traffic flows require a measure of flow control; and
   a traffic management module for receiving processed data packets from the packet processing module and for applying the measure of flow control to one or more of the traffic flows as required, wherein the traffic management module comprises a respective virtual output queue for each of the traffic flows and applies the measure of flow control to a given traffic flow by altering a rate at which data packets are emitted from a virtual output queue corresponding to the given traffic flow.

2. The apparatus of claim 1, wherein the traffic management module is operable to alter the rate by reducing the rate to zero, thereby halting emission of data packets from the virtual output queue.

3. The apparatus of claim 1, wherein the flow mapping engine comprises a table, and is operable using the table to determine, in dependence upon the level of congestion, the virtual output queue of the given traffic flow.

4. The apparatus of claim 3, wherein the flow mapping engine is further operable to use the table to determine, in dependence upon the level of congestion, one or more priorities of data packets of ingress traffic to the packet processing module that require a measure of flow control be applied to them.

5. The apparatus of claim 1, wherein the traffic management module is communicatively coupled to the packet processing module in a manner that allows processed data packets of a traffic flow to be sent from the traffic management module to the packet processing module for further packet processing.

6. The apparatus of claim 5, wherein the traffic management module comprises a respective virtual output queue for each of the traffic flows and wherein the traffic management module is operable to apply the measure of flow control to a given traffic flow by altering a rate at which data packets are emitted from a virtual output queue corresponding to the given traffic flow.

7. A method of performing flow control of traffic flows in a data communications system, the method comprising:

detecting a level of congestion of a packet processing module in the data communications system based upon at least two different thresholds;

determining whether or not a measure of flow control should be applied to a traffic flow being processed by the packet processing module depending on the level of congestion; and applying the measure of flow control to the traffic flow responsive to the determination being affirmative, wherein the measure of flow control is applied to a given traffic flow by altering a rate at which data packets are emitted from a virtual output queue corresponding to the given traffic flow.

8. The method of claim 7, wherein the step of detecting comprises:

comparing a current fill level of an input buffer of the packet processing module to the at least two different thresholds; and forming a backpressure message as a result of the comparison, wherein the backpressure message has a value that corresponds to a relationship between the current fill level and the at least two different thresholds.

9. The method of claim 8, wherein the step of determining further comprises:

making the determination for one or more of:
ingress traffic flows to the packet processing module,
recirculation traffic flows to the packet processing module, and
egress traffic flows from the data communication system.

10. The method of claim 9, wherein the step of making the determination further comprises:

determining in accordance with the value of the backpressure message which, if any, priorities of data packets of ingress traffic flows to the packet processing module are to have a measure of flow control applied to them and which, if any, types of recirculation and egress traffic flows are to have a measure of flow control applied to them.

11. The method of claim 10, wherein the step of applying further comprises:

halting ingress traffic flows to the packet processing module of data packets having a priority determined to require a measure of flow control, and halting egress and recirculation traffic flows of traffic types determined to require a measure of flow control.

12. The method of claim 11, wherein the step of applying further comprises:

changing a status of each virtual output queue corresponding to a respective one of the traffic flows requiring a measure of flow control so that the virtual output queue halts data packets emitting from it.

13. The method of claim 7, further comprising:
continually repeating the preceding steps.

14. The method of claim 8, further comprising:
defining three different values of the backpressure message.

15. The method of claim 14, further comprising:
defining a first value of the backpressure message when the current fill level is less than a first threshold.

16. The method of claim 15, further comprising:
defining a second value of the backpressure message when the current fill level is less than a second threshold but greater than or equal to the first threshold.

17. The method of claim 16, further comprising:
defining a third value of the backpressure message when the current fill level is greater than or equal to the second threshold.

18. The method of claim 15, further comprising:
halting only best effort (BE) traffic flows in response to the second value of the backpressure message.

19. The method of claim 17, further comprising:
halting both best effort (BE) and expedited forwarding (EF) traffic flows and sending only assured forwarding (AF) traffic flows in response to the third value of the backpressure message.

20. An apparatus for providing backpressure flow control to traffic flows of a data communications system, comprising:

a packet processing module for performing packet processing operations on data packets of the traffic flows;

a backpressure module for determining a level of congestion of the packet processing module based upon at least two different thresholds, wherein at least three different values of backpressure messages are used to select the traffic flows;

a flow mapping engine for determining, in dependence upon the level of congestion, which of the traffic flows require a measure of flow control; and a traffic management module for receiving processed data packets from the packet processing module and for applying the measure of flow control to one or more of the traffic flows as required.

* * * * *